United States Patent [19]

Wakabayashi

[11] Patent Number: 4,768,048
[45] Date of Patent: Aug. 30, 1988

[54] CAMERA HAVING PARTIALLY RETRACTABLE TAKING OPTICAL SYSTEM

[75] Inventor: Hiroshi Wakabayashi, Yokohama, Japan

[73] Assignee: Nippon Kogaku K. K., Tokyo, Japan

[21] Appl. No.: 8,321

[22] Filed: Jan. 29, 1987

Related U.S. Application Data

[62] Division of Ser. No. 677,516, Dec. 3, 1984, Pat. No. 4,669,848.

[30] Foreign Application Priority Data

| Dec. 7, 1983 | [JP] | Japan | 58-230883 |
| Dec. 7, 1983 | [JP] | Japan | 58-230884 |
| Dec. 15, 1983 | [JP] | Japan | 58-237014 |
| Feb. 17, 1984 | [JP] | Japan | 59-29050 |
| Feb. 21, 1984 | [JP] | Japan | 59-31141 |
| Mar. 23, 1984 | [JP] | Japan | 59-55786 |
| Apr. 16, 1984 | [JP] | Japan | 59-75991 |
| Apr. 19, 1984 | [JP] | Japan | 59-79062 |

[51] Int. Cl.⁴ .................... G03B 3/00; G03B 13/12
[52] U.S. Cl. ................. 354/195.12; 354/199; 354/222
[58] Field of Search ........... 354/400, 195.12, 199–201, 354/222

[56] References Cited

U.S. PATENT DOCUMENTS

| 2,995,061 | 8/1961 | Briskin et al. | 354/199 |
| 3,260,184 | 7/1966 | Pagel et al. | 354/199 |
| 4,038,673 | 7/1977 | Schroder | 354/195.12 |
| 4,451,129 | 5/1984 | Ikari et al. | 354/195.12 |

*Primary Examiner*—W. B. Perkey
*Attorney, Agent, or Firm*—Shapiro and Shapiro

[57] ABSTRACT

A camera has a variable focal length photographic optical system and has a viewfinder with magnifying power that is varied in accordance with the focal length of the photographic optical system. An electric motor has first and second transmissions adapted for connection of the motor to the photographic optical system and the viewfinder, respectively.

8 Claims, 11 Drawing Sheets

CAMERA HAVING PARTIALLY RETRACTABLE TAKING OPTICAL SYSTEM

This is a divisional patent application of U.S. Ser. No. 677,516, filed Dec. 3, 1984, now U.S. Pat. No. 4,669,848.

BACKGROUND OF THE INVENTION

1. Field of the Invention

The present invention relates to a camera having a picture taking optical system including a main lens system and a sub lens system, for example, said camera being operable in a wide-angle mode only by the use of the main lens system and in a telephoto mode by the use of the combination of the main lens system with the sub lens system.

2. Description of the Prior Art

One of the prior art cameras of such a type is disclosed in Japanese Laid-open Patent Application No. 145930/1983. This camera comprises a drive mechanism for moving a sub lens between a position in which it is inserted into the optical path of a main lens and a position in which the sub lens is retracted from said optical path. In the inserted position, the sub lens is combined with the main lens to form a picture taking optical system. In the retracted position of the sub lens, another picture taking optical system is defined only by the main lens.

On designing of the above drive mechanism, it is most important that the combined optical system is formed under such a state that the main lens is exactly aligned with the sub lens with respect to the optical axis. Moreover, the movable sub lens must firmly be held stationary relative to the camera housing so as to be unaffected by external impact or vibration.

SUMMARY OF THE INVENTION

It is a primary object of the present invention to provide a camera including a picture taking optical system of small and simple construction which can be changed to a plurality of optically functioning modes.

The present invention provides a camera having an improved high-precision picture taking optical system which can easily realize the automatic selection of various accessories such as a viewfinder optical system, focus adjusting device, lens cover and others.

DESCRIPTION OF PREFERRED EMBODIMENTS

Figure 1:
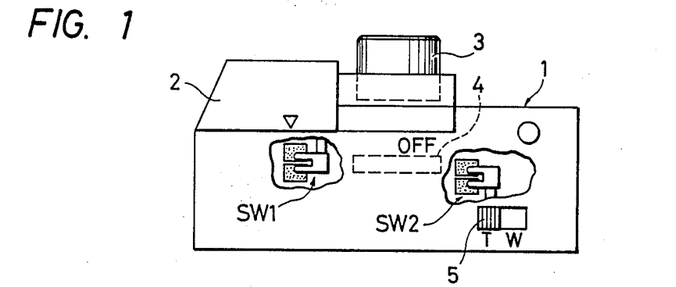
FIGS. 1 to 3 are plan views showing a camera according to one embodiment of the present invention, FIG. 1 showing a telephoto mode, FIG. 2 a wide-angle mode and FIG. 3 an inoperative mode.
Figure 2:
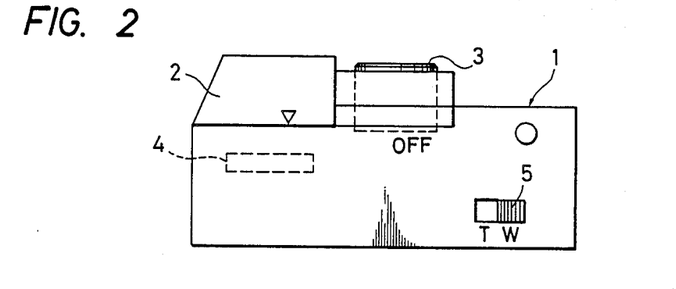
Figure 3:
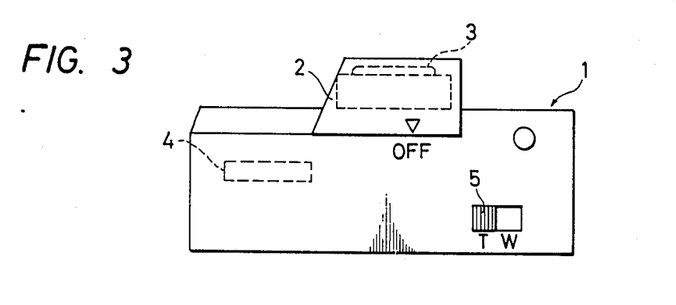

Referring now to FIGS. 1 to 3, there is shown a camera housing 1 comprising a dust cover 2 mounted on the front portion thereof so as to move leftward and rightward as viewed in the drawings, and a main lens 3 mounted on the same so as to move along its optical axis. The camera housing 1 contains a sub lens 4 which is movable transversely of the optical axis of the main lens 3. On the top of the camera housing 1 is mounted a knob 5 used to change the focal length of the optical system.

FIG. 1 shows the dust cover 2 in its open position. The knob 5 is in a position specifying a telephoto region designated by a letter "T". The main lens 3 is in its position forwardly moved from the front face of the cover 2. In this position, the main lens 3 is operatively combined with the sub lens 4, which has been inserted into the optical axis of the main lens 3, to form a combined optical system having a focal length in the telephoto region.

FIG. 2 shows the knob 5 in its position specifying a wide-angle region indicated by a letter "W". At the same time, the main lens 3 is retracted into the camera housing 1 while the sub lens 4 also is retracted away from the optical axis of the main lens 3. Thus, a focal length may be provided in the wide-angle region. In FIG. 3, the cover 2 is in its closed position in which the main lens 3 is covered by the cover 2. At this time, the main lens 3 is in its retracted position while the knob 5 is in its position indicative of the telephoto mode. The sub lens 4 also is in its retracted position. When the cover 2 is in its closed position, the inoperative position of the camera can visibly be recognized from the top of the camera by positioning an indicator on the top of the cover 2 at a position opposed to a letter "OFF" on the top of the camera housing 1.

The camera housing 1 further includes a switch SW1 operably associated with the cover 2 and a switch SW2 operably associated with the knob 5.

The switch SW1 consists of a sliding contact fixedly mounted on the cover and a conductive land fixedly located on the camera housing 1. When the cover is moved to its open position, this switch SW1 is turned on. When the cover is moved from its open position to its closed position, the switch SW1 is turned off. The switch SW1 is adapted to control the rotational direction of a motor 12 for driving the main lens 3 as will be described hereinafter and also to control the energization of a shutter control circuit 31 which will also be described hereinafter.

The switch SW2 consists of a sliding contact fixed to the knob 5 and a conductive land fixedly secured to the camera housing 1. The switch SW2 may be turned on or off depending on the position of the knob 5 such that the rotational direction of the motor 12 will be controlled. This switch SW2 is turned on when the knob 5 is in the telephoto position and turned off when the knob 5 is in the wide-angle position.

Figure 4:
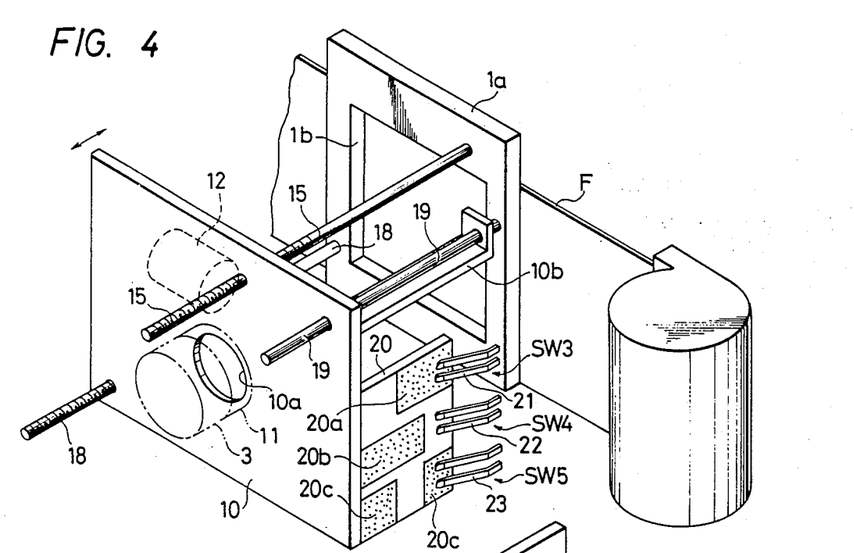
FIG. 4 is a perspective view showing a drive mechanism for a main lens in the above camera.

The main lens 3 is shifted by means of a mechanism shown in FIG. 4. FIG. 4 shows the main lens 3 in its extended position. A base plate 10 includes an opening 10a formed therethrough at the central portion, through which a light beam for taking picture is passed. The main lens 3 as well as an aperture and shutter device 11 shown by phantom lines are fixedly mounted on the base plate 10 in front of the opening 10a. The inner wall of the base plate 10 fixedly supports the motor 12 the rotation of which is transmitted to a gear 14 as seen from FIG. 5. The gear 14 is threadedly connected with a guide shaft 15 such that the latter will be moved along its own longitudinal axis as the gear 14 is rotated by the motor 12. The extremity of the guide shaft 15 is secured to the substrate 1a of the camera housing 1. The rotating shaft of the motor 12 is drivingly engaged at the other end by a gear train 16 so that the rotation of the motor 12 will be transmitted to a final gear 17 in the gear train 16. The gear 17 is threadedly connected with a guide shaft 18 to slide it longitudinally when the gear 17 is rotated. The extremity of the guide shaft 18 is connected with the substrate 1a of the camera housing 1. This gearing is so designed that the revolution and direction of the gear 14 are equal to those of the gear 17 for a given revolution of the motor 12.

A guide shaft 19 is connected at one end with the substrate 1a of the camera housing 1 such that the guide shaft 19 is slidably supported relative to the base plate 10 by means of an arm 10b which extends from the inner wall of the base plate 10.

The side of the base plate 10 fixedly supports a printed substrate 20 on the outer surface of which conductive lands 20a to 20c are provided. These conductive lands may slidably be engaged by three sliding contacts 21 to 23 on the camera housing, respectively. Each of the sliding contacts 21, 22 or 23 defines a switch SW3, SW4 or SW5 co-operating with the corresponding conductive land 20a, 20b or 20c. The switch SW3 is turned off when the main lens 3 is in its retracted position; the switch SW4 is turned off when the main lens 3 is in its extended position; and the switch SW5 is turned off when the main lens 3 is in its intermediate position between the retracted and extended positions. The switches SW3 and SW4 serve as limit switches for de-energizing the motor 12 as the main lens 3 is moved to its retracted or extended position. The switch SW5 is adapted to de-energize the shutter control circuit 31 such that the camera becomes inoperative when the main lens 3 is in the intermediate position between the retracted and extended positions to prevent the image of an object from being formed on the film plane.

A film F is disposed rearwardly of the framing opening 1b formed in the substrate 1a.

Figure 5:
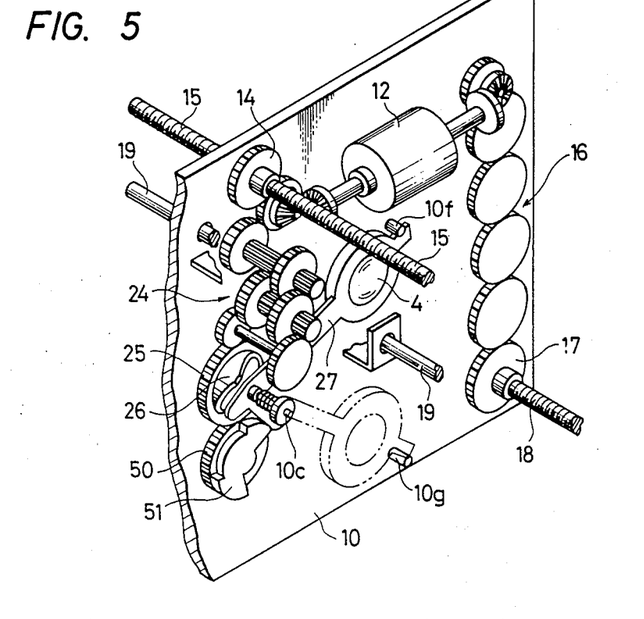
FIG. 5 is a perspective view showing a mechanism for driving a sub lens in the above camera.

As seen from FIG. 5, the inner wall of the base plate 10 operably supports a reduction gear train 24, a cam gear 25 and a holder 27. The holder 27 in turn supports the sub lens 4. The reduction gear train 24 serves to transmit the rotation of the above motor 12 to the cam gear 25. The cam gear 25 and the holder 27 are mounted on a common shaft and connected with each other through a face cam 26 formed on the top face of the cam gear.

The ratio of the reduction gear train 24 is so selected that the sub lens 4 will be inserted into the picture taking optical path as shown by solid lines when the main lens 3 is in its extended position and that the sub lens 4 will be retracted out of the picture taking optical path as shown by phantom lines when the main lens 3 is in its retracted position.

Figure 6:
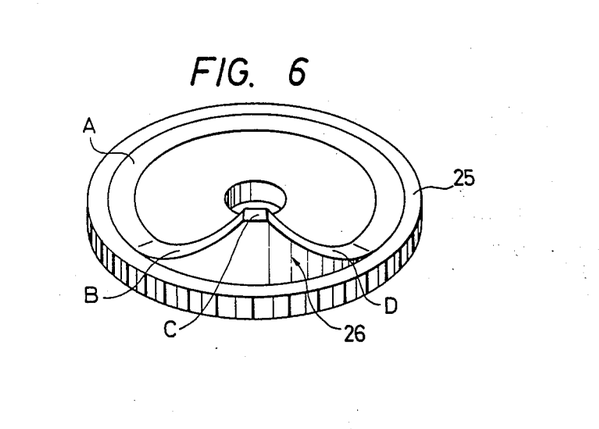
FIG. 6 is a perspective view of a face cam.

The cam gear 25 is engaged by a gear 50 having the same number of teeth as those of the cam gear 25. The gear 50 includes an interceptive plate 51 formed integrally thereon at one side. Thus, the interceptive plate 51 will be rotated synchronously with the rotation of the cam 26. As seen from FIG. 6, the face cam 26 is of an annulus configuration providing a lift in the rotational direction of the gear 25.

Figure 7A:
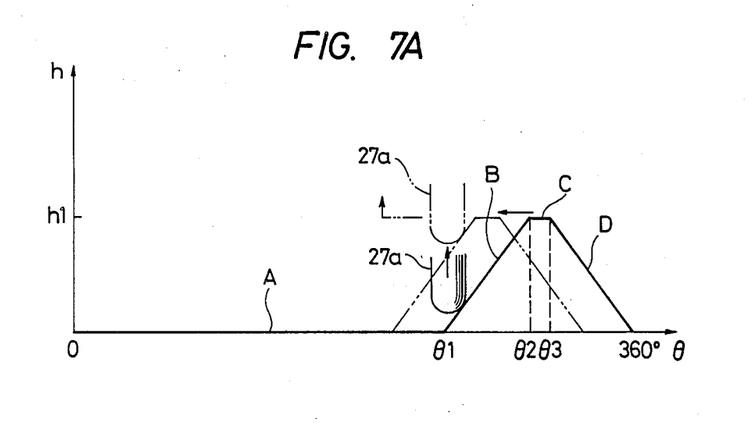
FIGS. 7A and 7B are diagrams showing the profile of the face cam and associated operations.
Figure 7B:
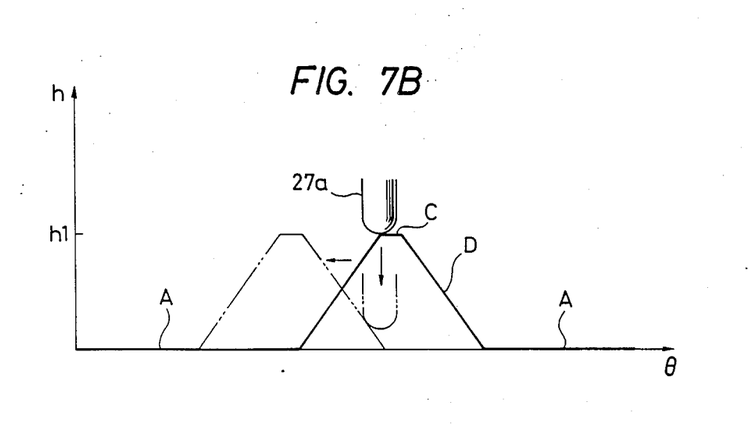

FIGS. 7A and 7B show the cam diagram of the cam 26 which includes a first flat section A having no lift between rotational angles $\theta$ and $\theta 1$, a first ramp section B providing the lift h linearly increasing from zero to h1, a second flat section C providing the lift h held at h1 between $\theta 2$ and $\theta 3$, and a second ramp section D providing the lift h linearly decreasing from h1 to zero between $\theta 3$ and 360°.

Figure 8A:
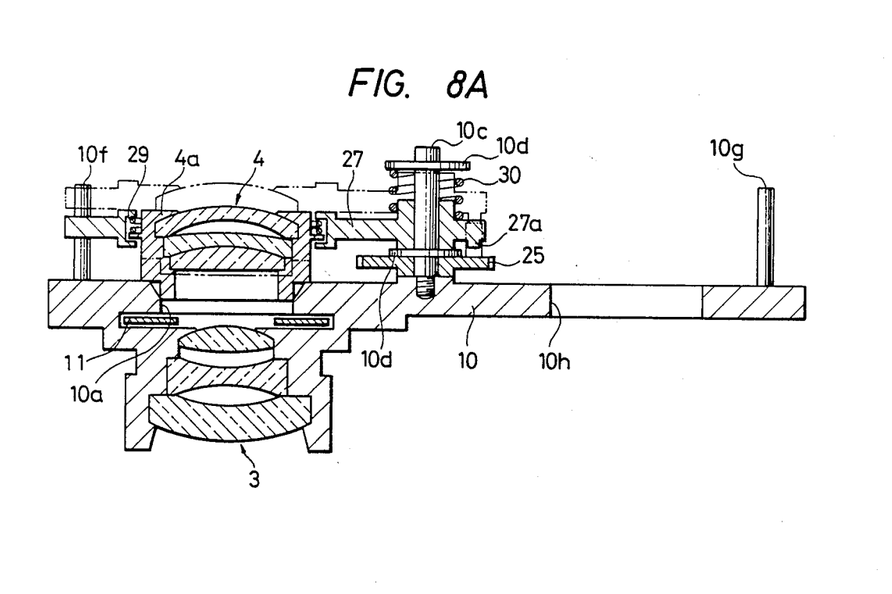
FIGS. 8A and 8B are cross-sectional views showing the drive mechanism for the sub lens.
Figure 8B:
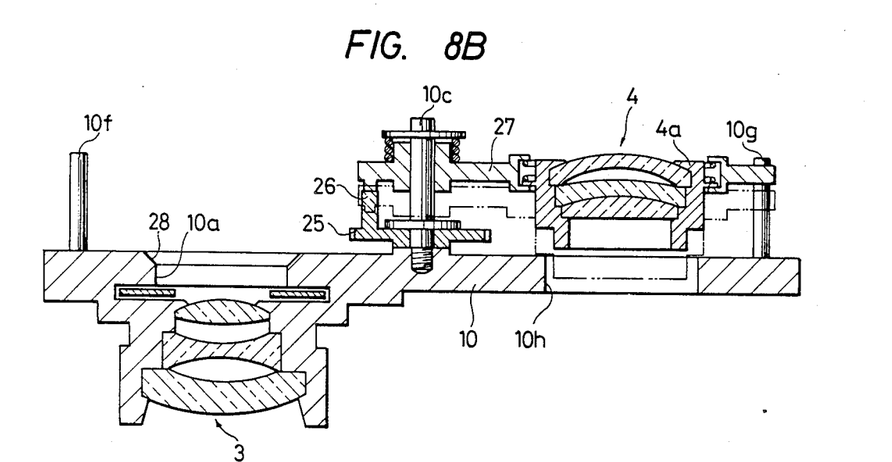

FIGS. 8A and 8B illustrate a mechanism for driving the sub lens.

As seen from FIGS. 8A and 8B, the main lens 3 and the aperture and shutter device 11 are fixedly mounted on the base plate 10 in front of the opening 10a which is formed at the inlet side with a chamfered guide face 28.

The sub lens 4 is held by emans of a cylinder 4a formed at the lower portion with a sleeve and flange. When the sleeve of the cylinder 4a is engaged by the inner circumference of the opening 10a and the flange of the same is engaged by the inner wall of the base plate 10, the optical axis of the sub lens 4 will be aligned with that of the main lens 3. At the same time, the sub lens 4 will be positioned in place along the optical axis.

The holder 27 is rotatably mounted about a stationary shaft 10c standing on the base plate 10 such that the holder 27 can be slid and rotated between two flanges 10d on the shaft 10c. The holder 27 is downwardly biased by means of a coil spring 30. The central portion of the holder 27 contains a cylinder 4a which is urged downwardly by means of a coil spring 29.

The cam face 26 on the cam gear 25 is in contact with a stylus 27a formed in the underside of the holder 27. The free end of the holder 27 will engage a fixed pin 10f when the sub lens 4 is in a position shown in FIG. 8A and a fixed pin 10g when the sub lens 4 is in a position shown in FIG. 8B.

The base plate 10 further includes a circular hole 10h formed therein in which the sleeve of the cylinder 4a will fall when the cylinder 4a is retracted out of the optical path of the main lens.

Figure 9:
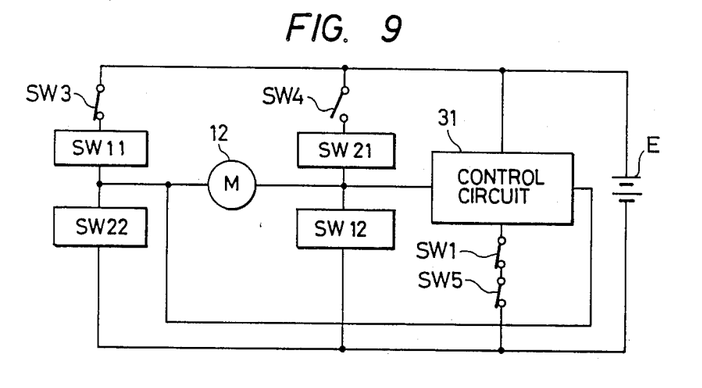
FIG. 9 is a circuit diagram of a motor control.

FIG. 9 shows a control circuit for the motor 12 adapted to the lenses 3 and 4. As seen from FIG. 9, the motor 12 may be energized through either of three supply paths. The first path includes the positive terminal of a power supply E, the switch SW3, the switch SW11, the motor 12, the switch SW12 and the negative terminal of the power supply E. When the motor 12 is energized through the first path, it is forwardly rotated to move the main lens 3 to its retracted position and at the same time to move the sub lens 4 to its retracted position.

The second path includes the positive terminal of the power supply E, the switch SW4, the switch SW21, the motor 12, the switch SW22 and the negative terminal of the power supply E. When the motor is energized through the second path, it is rearwardly rotated to move the main lens 3 to its extended position and simultaneously to move the sub lens 4 to its inserted or operative position.

Figure 10:
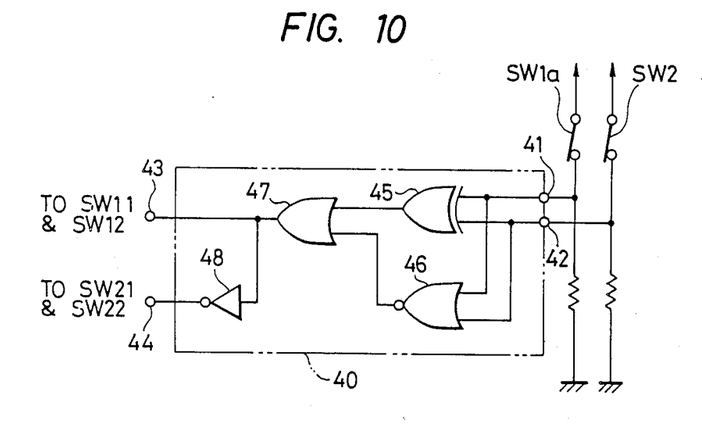
FIG. 10 is a diagram of a logic circuit.

The switches SW11, SW12, SW21 and SW22 are in the form of a semiconductor switch controlled through a logic circuit 40 shown in FIG. 10.

The third path connects the motor 12 with a circuit 31 for automatically adjusting the focus and controlling the shutter. The motor will be rotated forwardly and rearwardly by the output of this control circuit 31 to move the optical system forwardly and rearwardly along the optical axis to provide a proper focus.

The switches SW1 and SW5 are connected in series with each other and inserted into the supply path of the control circuit 31. The switch SW1 is turned on only when the cover 2 is in its open position. The switch SW5 is turned on only when the main lens 3 is in either of the extended and retracted positions. In such a manner, the automatic focus adjustment and shutter may be prevented from operating when the cover 2 and lenses 3, 4 are in their unsuitable positions for picture taking.

As shown in FIG. 10, the logic circuit 40 includes a pair of input terminals 41, 42 and a pair of output terminals 43, 44. The input terminal 41 is connected between a switch SW1a operably associated in phase with the above switch SW1 and an earth resistance; the input terminal 42 is connected between the above switch SW2 and the earth resistance; the output terminal 43 is connected with the control terminals of the switches SW11 and SW12; and the output terminal 44 is connected with the control terminals of the switches SW21 and SW22. The input terminal 41 becomes High level when the switch SW1a is turned on, that is, when the cover 2 is opened and becomes Low level when the switch SW1a is turned off, that is, when the cover 2 is closed. The input terminal 42 becomes High level when the switch SW2 is turned on, that is, when the knob 5 is in its telephoto position and becomes Low level when the switch SW2 is turned off, that is, when the knob 5 is in its wide-angle position. At High level, the output terminal 43 brings both the switches SW11 and SW12 into their ON positions. At Low level, these switches SW11 and SW12 are turned off by the output terminal 43. The output terminal 44 brings both the switches SW21 and SW22 into their ON positions at High level and into their OFF positions at Low level, respectively.

The input terminal 41 is connected with one input terminal of an exclusive OR gate 45 and one input terminal of a NOR gate 46. The input terminal 42 is connected with the other input terminal of the exclusive OR gate 45 and the other input terminal of the NOR gate 46. The output terminals of the gates 45 and 46 are connected with two input terminals of an OR gate 47, respectively. the output terminal of the OR gate 47 is connected with the output terminal 43 and an input terminal of an invertor 48. The output terminal of the invertor 48 is connected with the output terminal 44.

The following table collectively shows the position of the cover 2, the position of the knob 5, the states of the switches SW1 and SW2 depending on the positions of the cover and knob, the states of the input terminals 41, 42 of the logic circuit 40, the levels of the output terminals 43, 44, the states of the switches SW11, SW12, SW21, and SW22, and the positional relationship between the main and sub lenses 3, 4.

TABLE

| POS. 2 | POS. 5 | SW1 | SW2 | 41 | 42 | 43 | 44 | SW11 SW12 | SW21 SW22 | POS. 3 | POS. 4 |
|---|---|---|---|---|---|---|---|---|---|---|---|
| OPEN | T | ON | ON | H | H | L | H | OFF | ON | EXTENDED | FULL INSERTION |
| OPEN | W | ON | OFF | H | L | H | L | ON | OFF | RETRACTED | FULL RETRACTION |
| CLOSE | T | OFF | ON | L | H | H | L | ON | OFF | RETRACTED | FULL RETRACTION |
| CLOSE | W | OFF | OFF | L | L | H | L | ON | OFF | RETRACTED | FULL RETRACTION |

(1) When the cover 2 is opened and the knob 5 is aligned with the letter "T" as shown in FIG. 1 and if the main lens 3 has already been in its extended position, the switches SW1 and SW2 are both in their ON states so that both the input terminals 41 and 42 of the logic circuit 40 becomes High level. The output terminals of the exclusive OR gate 45 and the NOR gate 46 become Low level while the output terminal of the OR gate 47 also becomes Low level. Thus, the output terminals 43 and 44 of the logic circuit 40 become Low and High levels respectively. Therefore, the switches SW11 and SW12 shown in FIG. 9 will be turned off so that the first path mentioned above will not be formed. Although the switches SW21 and SW22 are turned on, the second path mentioned above will not also be formed since the main lens 3 is in its extended position to hold the switch SW4 at its OFF position as shown in FIG. 4.

Under such a situation, the sub lens 4 is held at its fully inserted position in which the cylinder 4a is totally engaged by the opening 10a as shown in FIG. 8A. Consequently, a composite optical system will be defined by the main and sub lenses 3 and 4 with its focal length being in the telephoto region. Since both the switches SW1 and SW5 are in their ON states, the control circuit 31 is operable and then the telephoto optical system is operable for picture taking.

When the picture taking operation is initiated, the motor 12 is then energized through the third path to move the main and sub lenses 3, 4 along the optical axis from a position near the telephoto region to infinity for focus adjustment.

During rotation of the motor 12 for focus adjustment in the telephoto region, the stylus 27a of the holder 27 is positioned opposed to the first flat section A of the cam 25 without contact.

(2) When the knob 5 is moved from such a state as shown in FIG. 1 to the position opposed to the letter "W", the switch SW2 is turned off to bring the input terminal 42 of the logic circuit 40 into Low level. Thus, the output terminals 43 and 44 are inverted to High and Low levels, respectively. Therefore, the switches SW11 and SW12 shown in FIG. 9 are turned on while the switches SW21 and SW22 are turned off. Since the switch SW3 is in its On state, the first path mentioned above will be formed to rotate the motor 12 forwardly.

As a result, the base plate 10 will be moved toward the substrate 1a with the main lens 3.

During the initial rotation of the motor 12, the sub lens 4 is upwardly moved along the optical axis from the fully inserted position to a position as shown by phantom lines in FIG. 8A. This upward movement of the sub lens 4 is produced by the fact that the cam 26 is rotated clockwise, that is, the cam diagram of FIG. 7A is moved leftward as shown by phantom lines such that the stylus 27a of the holder 27 is lifted by the ramp B of the face cam.

Figure 11A:
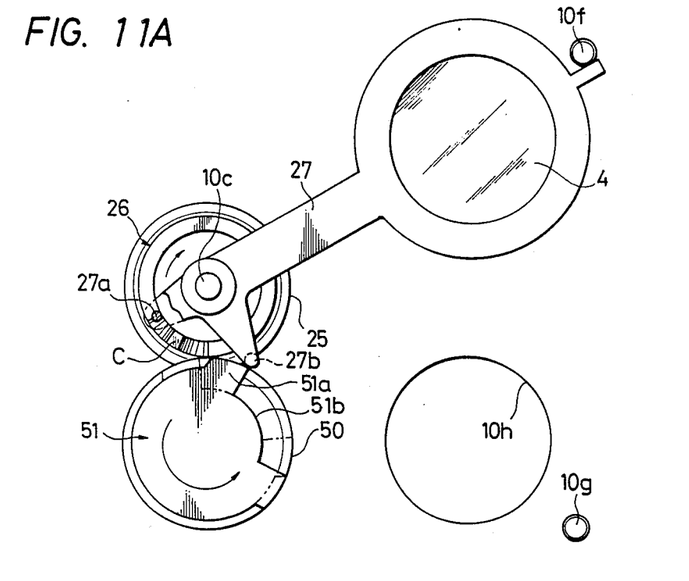
FIGS. 11A and 11B are plan views of the sub lens driving mechanism.

FIG. 11A is a plan view showing the positional relationship of the cam 26, the holder 27 and the interceptive plate 51 of the gear 50, corresponding to the state shown in FIG. 7A and 8A. Under the state of FIG. 7A in which the stylus 27a is positioned opposed to region between the cam sections A and B, the engagement portion 27b of the holder 27 contacts the shoulder 51a of the interceptive plate 51 so that the clockwise rotation of the holder 27 will be intercepted. When the cam is rotated to lift the holder 27 as the result of the initial rotation of the gears 25 and 50 in the direction of arrows, a notch 51b in the interceptive plate 51 is positioned opposed to the engagement portion 27b. Since the cylinder 4a has been disengaged from the opening 10a by the upward movement of the holder 27, the latter is rotated clockwise about the shaft 10c with the stylus 27a biased upwardly by the cam ramp B. When the tip of the holder 27 is engaged by the fixed pin 10g, a further rotation of the holder 27 is intercepted, but the cam 26 is further rotated until the stylus 27a rides the section C.

Figure 11B:
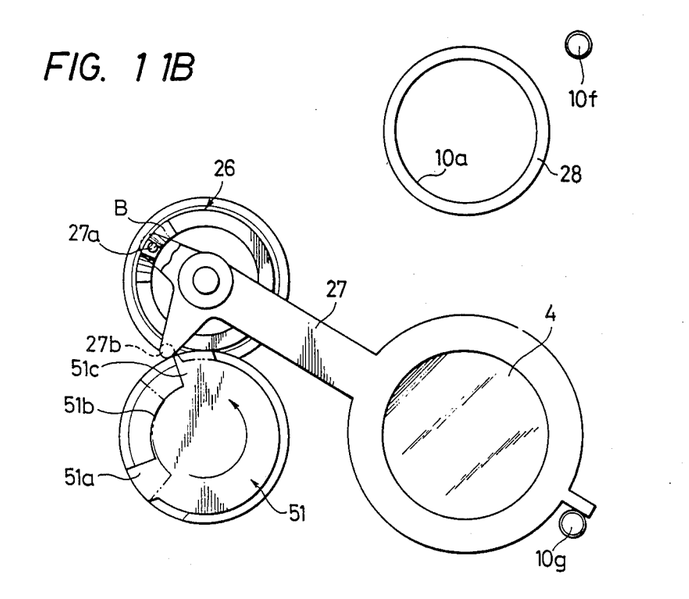

Such a condition is shown in FIGS. 7B, 8B and 11B. As seen from FIG. 11B, the other shoulder 51c of the interceptive plate 51 contacts the stylus 27b to prevent the rearward rotation of the holder 27.

When the motor is further rotated, the second ramp section D of the cam is brought under the stylus 27a. The holder follows the descendent ramp of the cam and is downwardly moved resiliently under the action of the spring 30 until the cylinder 4a is inserted into the circular hole 10h of the base plate. In this manner, the sub lens 4 will be fully retracted out of the optical path in the main lens 3. Various positions of the components at this time are shown by phantom lines in FIGS. 7B, 8B and 11B.

When the main lens 3 reaches its retracted position, the switches SW3, SW4 and SW5 are turned off, on and on, respectively. When the switch SW3 is turned off, the first path mentioned above is cut off to deenergize the motor 12. Therefore, the main and sub lenses 3 and 4 are held stationary at their fully retracted position. The optical system will thus be defined only by the main lens 3 with the focal length thereof being in the wide-angle region. Since both the switches SW1 and SW5 are in their ON state, the control circuit 31 is operative to provide control of the wide-angle optical system.

When the picture taking operation is initiated under such a situation, the motor 12 is energized through the third path to rotate in such a manner that the main lens 3 is moved along the optical axis from a position near the wide-angle region to infinity for focus adjustment.

During rotation of the motor 12 for focus adjustment in the wide-angle region, the stylus 27a is aligned with the first flat section A of the cam. Thus, the holder 27 is not moved so as to keep the sub lens 4 at its fully retracted position.

(3) When the cover 2 is moved from the open position of FIG. 1 toward the closed position, the switch SW1 is turned off so that the input terminal 41 of the logic circuit 40 becomes Low level and the output terminal of the exclusive OR circuit 45 becomes High level. The proceeding operations are similar to those described in connection with the above process (2). In spite of the knob 5 being located at the telephoto position, the main lens 3 may be moved from its extended to retracted position while at the same time the sub lens 4 may be shifted from its fully inserted to fully retracted position. When the main lens 3 is moved to its retracted position, the cover 2 can be closed completely. When the cover 2 reaches its closed position, the switch SW1a operated in phase with the switch SW1 is turned off such that the control circuit 31 will be de-energized to make the camera inoperative. This state is shown in FIG. 3.

(4) When the cover 2 is moved from the position of FIG. 2 to the closed position, the switch SW1a operated in phase with the switch SW1 is turned off such that the control circuit 31 will be de-energized to hold the camera inoperative.

(5) When the knob 5 is shifted from the position of FIG. 2 to the telephoto position, the switch SW2 is turned on to bring both the input terminals 41 and 42 of the logic circuit 40 into High level and to invert the output terminals 43 and 44 into Low and High level, respectively. Since the switch SW4 is in its ON state at this time, the second path mentioned above is formed so that the motor 12 begins to rotate in the direction opposite to that in the process (2). Thus, the main lens 3 begins to move from the retracted to extended position.

The rearward rotation of the motor 12 causes the gears 25 and 50 to rotate rearwardly also. Accordingly, the sub lens 4 is shifted through the opposite process to the aforementioned process so that the cylinder 4a will again be inserted into the opening 10a.

Figure 12:
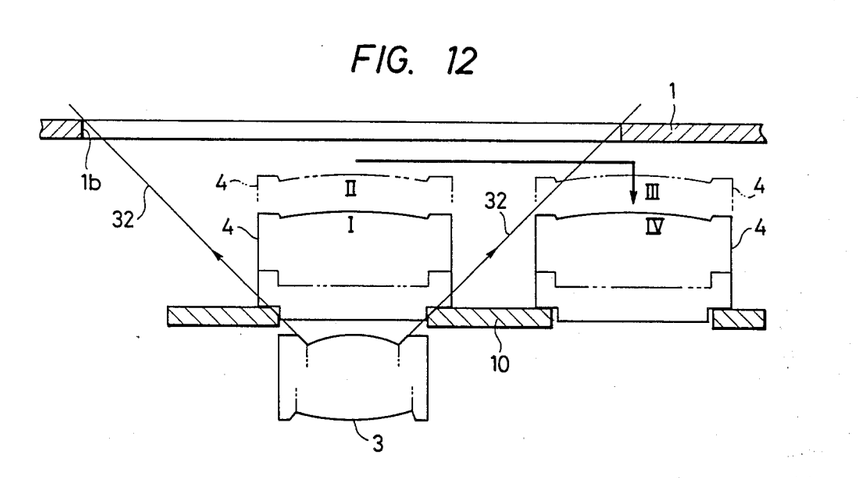
FIG. 12 illustrates the movement of the sub lens.

The retraction of the sub lens 4 out of the optical path in the aforementioned embodiment of the present invention will now be described in more detail in connection with FIG. 12.

The sub lens 4 is moved from the fully inserted position I upwardly to a position II along the optical axis of the main lens 3. The sub lens 4 is then moved from the position II to a position III in the horizontal direction perpendicular to the optical axis. The sub lens 4 is finally moved downwardly from the position III to a position IV at which it is fully retracted out of the optical path 32 of the main lens. The movement of the sub lens 4 from the position III to the position IV is made in the direction opposite to the direction in which the picture taking light beam impinges upon the film from the main lens. Due to the retraction of the sub lens in such a direction, the camera may be designed to be more compact compared with the prior art structure in which the sub lens is shifted only in the horizontal direction.

Figure 13:
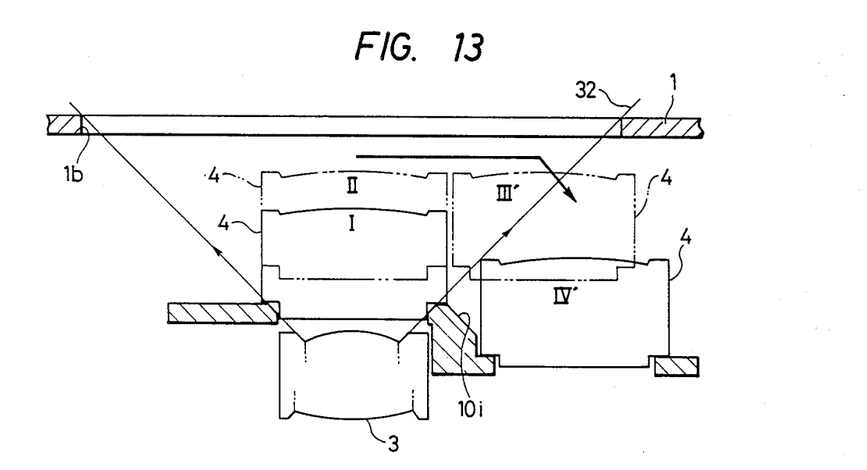
FIG. 13 illustrates modified movement of the sub lens.

In the another embodiment of the present invention shown in FIG. 13, a position IV' at which the sub lens 4 is fully retracted out of the optical path is in front of the position I with respect to a direction along the optical axis. Therefore, the sub lens 4 can be retracted nearer the main lens 3 such that the camera will be even more compact. In this embodiment, there is formed a ramp 10i between two openings determining the positions I and IV' of the sub lens 4. When the sub lens 4 is moved from the position I to the position II by the same mechanism as that in the aforementioned embodiment, it is then moved horizontally through the first half of the rotation of the holder 27. Through the second half of the rotation of the holder 27, the sub lens 4 is guided toward the position IV' by the ramp 10i.

There will now be described an embodiment of a viewfinder having a variable magnification which can be changed in association with the change of focal length in the picture taking lens system.

Figure 14A:
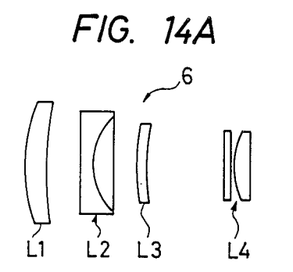
FIGS. 14A, 14B and 14C illustrate a viewfinder optical system being changed from one position to another position.

The top of the camera housing shown in FIG. 1 is provided with a rangefinder unit including a finder optical system shown in FIG. 14A. The finder optical system 6 includes first lens L1, second lens L2, third lens L3 and fourth lens L4 in the order starting from the object side. The first, second and third lenses (L1, L2, L3) defines a forward group while the fourth lens L4 define a rearward group. The forward and rearward groups define an inverted Galilean finder. It is noted that the lens L1 is of positive power and the lens L2 is of negative power.

Figure 14B:
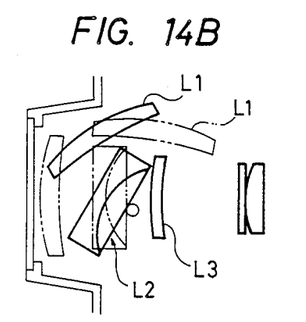
Figure 14C:
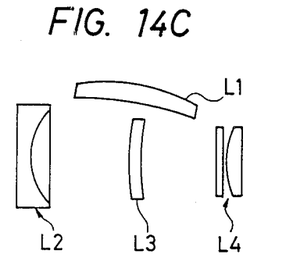

When the picture taking lens system is changed from the telephoto mode to the wide-angle mode, the finder optical system 6 also is changed from the telephoto position shown in FIG. 14A to the wide-angle position shown in FIG. 14C. In the wide-angle position, the lens L1 is retracted out of the optical path and the lens L2 is moved toward the object substantially to a position in which the lens L1 was placed. During this process, the lens L2 is rotated about an axis perpendicular to the optical axis out of the way of the lens L1 by means of a mechanism described hereinafter, as shown in FIG. 14B.

Figure 15A:
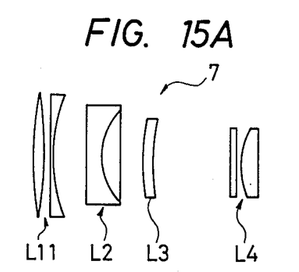
FIGS. 15A, 15B and 15C illustrate a modified viewfinder optical system being changed from one position to another position.
Figure 15B:
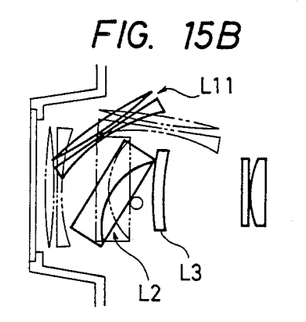
Figure 15C:
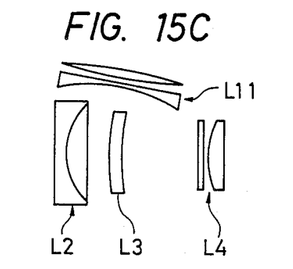

FIG. 15A shows another finder optical system 7 in which the lens L1 is replaced by an afocal system L11 including the combination of a positive power lens with a negative power lens. In such a case, the difference between the telephoto position of FIG. 15A and the wide-angle position of FIG. 15C is only the retraction of the lens L11 out of the optical path. Therefore, the lens L2 is temporarily rotated and then returned to its original position during the process of change.

Figure 16:
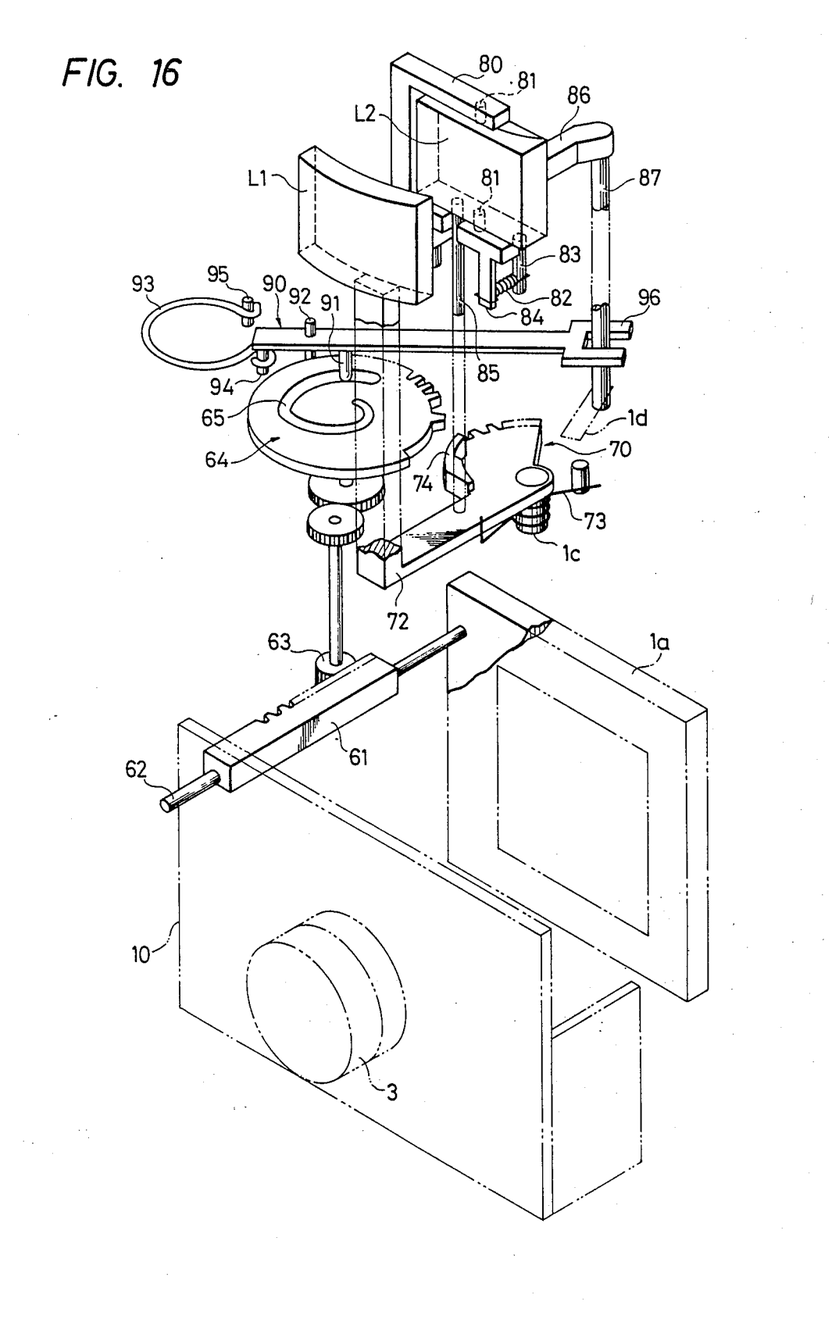
FIG. 16 is a perspective view of a mechanism for changing the position of the viewfinder optical system.

FIG. 16 shows a mechanism for altering the position of the finder optical system. The mechanism includes a rack 61 fixedly supported by the inner wall of the base plate 10 shown in FIG. 4. The base plate 10 and thus the rack 61 is adapted to move in the direction of the optical axis of the main lens 3 along a guide shaft 62 standing on the substrate 1a.

The rack 61 is engaged by a pinion 63 the rotation of which is transmitted to a rotary cam plate 64 through a reduction gear train.

The cam plate 64 includes a cam groove 65 formed thereon at the top. The outer periphery of the cam plate 64 is formed with teeth and a sliding contact face. As best seen from FIGS. 17A to 17D, the teeth on the cam plate comprise a forefront tooth 66a and a tooth train 66b having a plurality of teeth including a second tooth spaced away from the first tooth 66a by one tooth. The sliding contact face of the cam plate 64 is aligned with the addendum circle of the tooth train.

The mechanism further comprises a lever 70 pivotably mounted about the fixed shaft 1c on the camera housing and disposed adjacent to the cam plate 64. The lever 70 includes a forefront tooth 71a and a tooth train 71b adapted to engage the teeth 66a and 66b on the cam plate, and an L-shaped arm 72 on the outer end of which the first lens L1 is fixedly mounted. The lever 70 is biased clockwise by means of a spring 73. The lever 70 further includes a cam 74 engaged by a rod 85 fixedly mounted on the second lens L2. As best seen from FIG. 17D, the cam 74 includes a first cam face 74a providing a radial lift about the shaft 1c and a circumferential cam face 74b.

The second lens L2 is pivotably connected with a frame 80 through a shaft 81. The frame 80 is so supported that it can move linearly along the optical axis of the finder optical path within the camera housing. A tension spring 82 is operatively located between a pin 83 extending from the lens L2 and a pin 84 extending from the frame 80. Thus, the pin 83 is urged toward the pin 84 to align, the optical axis of the lens L2 with that of the finder optical system. Said rod 85 extends from the underside of the lens L2.

The cam groove 65 of the cam plate 64 is engaged by a driven pin 91 extending from a lever 90 which is pivotably mounted on the housing through a shaft 92. A turn-over spring 93 is operatively disposed between a pin 94 extending for the tip of the lever 90 and a pin 95 fixedly secured to the housing. The cam groove 65 on the cam plate includes a first circumferential groove section 65a in which the driven pin 91 is prevented from moving, a drive groove section 65b in which the driven pin 91 can be moved and the lever 90 can be pivoted, and a second circumferential groove section 65c in which the driven pin 91 is again prevented from moving.

The tip of the pivotal lever 90 is formed with a fork 96 which receives a rod 87 extending downwardly from an arm 86 which extends rearwardly from the frame 80.

The tip of the rod 87 is fitted into a slit 1d formed in the housing. When the rod 87 is pressed against one end of the slit 1d under the action of the spring 93, the driven pin 91 is held within the first circumferential groove 65a and yet in noncontact with the side walls of this groove. When the rod 87 is positioned at the other end of the slit 1d, the driven pin 91 is positioned in the second circumferential groove 65c in non-contact with the side walls thereof.

The non-contact relationship between the driven pin and the grooves assures that the rotation of the cam plate 64 is prevented from being transmitted to the second lens L2 by vibration.

Figure 17A:
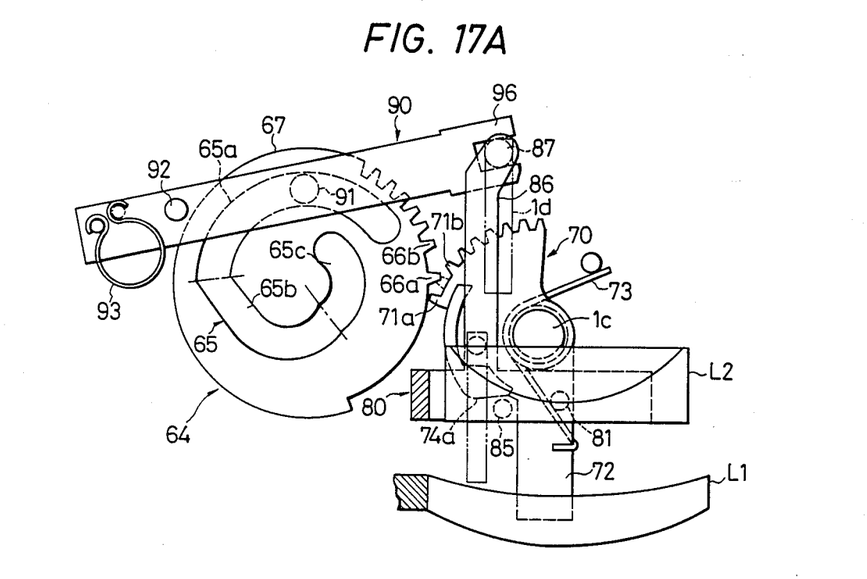
FIGS. 17A, 17B, 17C and 17D are plan views showing the mechanism for changing the position of the viewfinder optical system, this optical system being moved between the telephoto position shown in FIG. 17A and the wide-angle position shown in FIG. 17D.

When the picture taking optical system is in the telephoto mode, the driven pin 91 is within the first circumferential groove 65a and the tooth 71a on the lever 70 is in non-contact with the outer periphery of the cam plate 64, as shown in FIGS. 16 and 17A. The focusing during this period, that is, the rotation of the cam plate by the motion of the base plate 10 will not provide any motion or vibration to the finder optical system.

When the knob 5 in the housing is shifted to the letter "W", the motor 12 is rotated to move the base plate 10 as well as the rack 61 rearwardly through a larger distance. The cam plate 64 is thus rotated clockwise through a larger distant. As a result, the tooth 66a thrusts the tooth 71a of the lever 70 so that the teeth 66b will be engaged by the teeth 71b. Spacings between the teeth 66a and 66b and between the teeth 71a and 71b are so selected as to provide a smooth engagement.

Figure 17B:
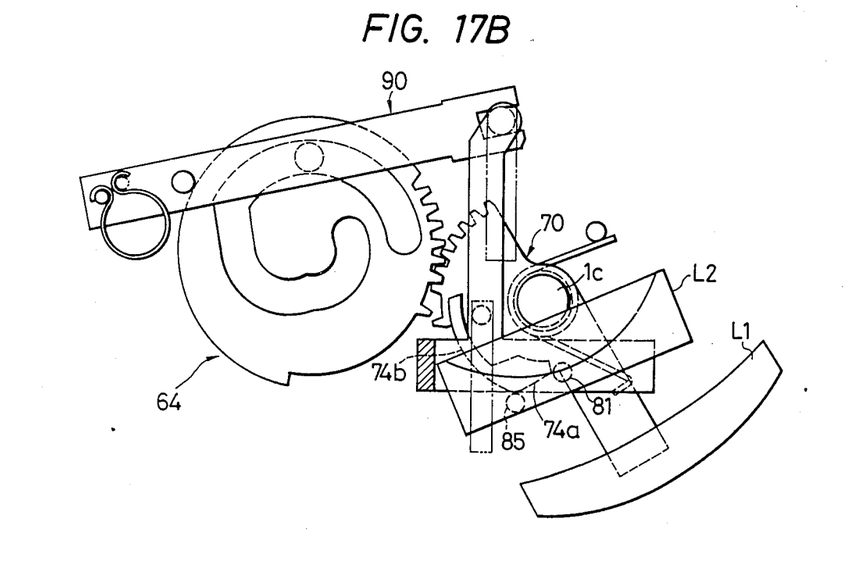
Figure 17C:
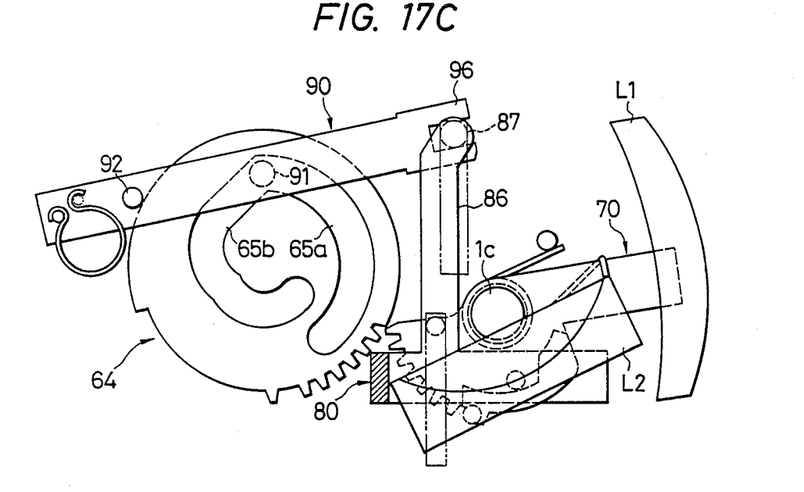

As a result, the lever 70 is pivoted to press the rod 85 against the first cam face 74a so that the lens L2 will be rotated about the shaft 81, as shown in FIG. 17B. When the rod 85 reaches the second cam face 74b, the lens L2 will be held at a fixed angle. With the angular displacement of the lens L2, the first lens L1 as well as the lever 70 are moved along a circular arc about the shaft 1c and brought into such a state as shown in FIGS. 17C and 14B.

Figure 17D:
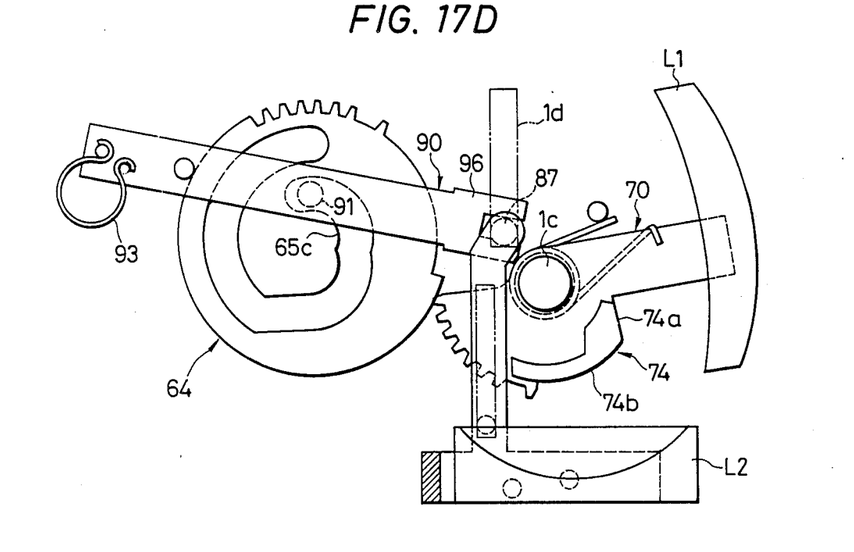

Thereafter, the driven pin 91 on the pivotal lever 90 is moved from the first circumferential groove 65a to the drive groove 65b. Therefore, the lever 90 is pivoted clockwise about the shaft 92 to thrust the frame 80 forwardly through the fork 96, the rod 87 and the arm 86. The rod 85 is moved out of the second cam face 74b to return the lens L2 to its original or forward facing position and then the position which has been occupied by the first lens L1. The pivotal lever 90 is inverted and held at the wide-angle position under the action of the turn-over spring 93 and moved to such a state as shown in FIGS. 17D and 14C. This provides a wide-angle finder optical system.

In the wide-angle position, even if the cam plate 64 is rotated to adjust the focus, the rod 87 is firmly held between the fork 96 of the pivotal lever 90 and the other end of the slit 1d. On the other hand, the driven pin 91 of the pivotal lever 90 is moved within the range of the second circumferential groove 65c without contacting the side walls thereof.

I claim:
1. A camera comprising:
    (a) photographing optical means having an optical system capable of altering the focal length of said photographing optical means;
    (b) viewfinder means having an optical system capable of altering magnifying power of said viewfinder means corresponding to the focal length of said photographing optical means;
    (c) an electric motor;
    (d) first transmission means adapted for the connection of said motor to said photographing optical means;
    (e) second transmission means adapted for the connection of said motor to said viewfinder means, said second transmission means including means for separating the connection of said motor to said viewfinder means during focusing of said photographing optical means; and
    (f) control means including circuit means for actuating said motor, the control means causing said motor to simultaneously drive said first and second transmission means for altering the focal length of said photographing optical means and for altering the magnifying power of said viewfinder means.

2. A camera according to claim 1, wherein said second transmission means includes a cam member and a cam follower member which are coupled to each other during alteration of the focal length and during alteration of the magnification, and which are separated from each other during said focusing.

3. A camera comprising:
    (a) photographing optical means capable of switch-over between first and second focal lengths;
    (b) viewfinder optical means capable of effecting switch-over between first and second magnifications corresponding to said first and second focal lengths, respectively, of said photographing optical means, the viewfinder optical means including a finder optical path, a first movable optical system which is inserted in said finder optical path for making said first magnification and retracted from said finder optical path for making said second magnification, and a second movable optical system disposed near said first movable optical system; and
    (c) means for driving said photographing optical means and said first and second movable optical systems in synchronism with one another, said second movable optical system being displaced from the path of said first movable optical system during the movement of said first movable optical system;
    said driving means including means for rotating said second movable optical system around an axis substantially normal to said finder optical path, and means for moving said second movable optical system along said finder optical path.

4. A camera according to claim 3, wherein the last-mentioned means moves said second movable optical system along said finder optical path after rotation by said rotating means.

5. A camera according to claim 4, wherein said driving means includes first driving means which actuates said photographing optical means for the switch-over of the focal length, and second driving means which operates each of said first and second movable optical systems in synchronism with said first driving means.

6. A camera according to claim 3, wherein said driving means includes first driving means which actuates said photographing optical means for the switch-over of the focal length, and second driving means which operates each of said first and second movable optical systems in synchronism with said first driving means.

7. A camera comprising:
    (a) photographing optical means having an optical system capable of altering the focal length of said photographing optical means and effecting focusing toward an object;
    (b) viewfinder means having an optical system capable of altering magnifying power of said viewfinder means corresponding to the focal length of said photographing optical means;
    (c) an electric motor;
    (d) first transmission means adapted for the connection of said motor to said photographing optical means;
    (e) second transmission means adapted for the connection of said motor to said viewfinder means; and
    (f) control means including circuit means for actuating said motor, the control means causing said motor to simultaneously drive said first and second transmission means for altering the focal length of said photographing optical means and for altering the magnifying power of said viewfinder means and to drive said first transmission means for the focusing of said photographing optical means.

8. A camera according to claim 7, wherein said photographing optical means has first and second focal lengths and is driven between said first and second focal lengths, and said viewfinder means has first and second magnifying powers corresponding to the first and second focal lengths, respectively, of said photographing optical means and is driven between said first and second magnifying powers.

* * * * *